(12) United States Patent
Fresko

(10) Patent No.: US 7,421,698 B2
(45) Date of Patent: Sep. 2, 2008

(54) SYSTEM AND METHOD FOR DYNAMICALLY AND PERSISTENTLY TRACKING INCREMENTAL PROFILING DATA IN A PROCESS CLONING APPLICATION ENVIRONMENT

(75) Inventor: Nedim Fresko, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 780 days.

(21) Appl. No.: 10/745,018

(22) Filed: Dec. 22, 2003

(65) Prior Publication Data

US 2005/0138623 A1 Jun. 23, 2005

(51) Int. Cl.
  *G06F 9/46* (2006.01)
  *G06F 9/54* (2006.01)
(52) U.S. Cl. ...................... 719/310; 718/104
(58) Field of Classification Search .......... 719/310; 718/104
  See application file for complete search history.

(56) References Cited

U.S. PATENT DOCUMENTS

| | | | |
|---|---|---|---|
| 6,272,674 B1 * | 8/2001 | Holiday, Jr. ................. | 717/174 |
| 6,687,849 B1 * | 2/2004 | Cherf ......................... | 714/5 |
| 6,823,509 B2 * | 11/2004 | Webb ......................... | 718/1 |
| 7,100,089 B1 * | 8/2006 | Phelps ........................ | 714/42 |
| 7,191,304 B1 * | 3/2007 | Cameron et al. ............ | 711/202 |
| 2003/0033344 A1 | 2/2003 | Abbott et al. | |
| 2003/0115297 A1 * | 6/2003 | Branson et al. ............. | 709/220 |
| 2004/0111581 A1 * | 6/2004 | Arimilli et al. .............. | 711/202 |
| 2004/0221290 A1 * | 11/2004 | Casey et al. ................ | 718/104 |

OTHER PUBLICATIONS

James S. Plank, "Diskless Checkpointing", IEEE Transactions on Parallel and Distributed Systems, vol. 9, No. 10, Oct. 1998, XP-002443762.
Quintin Cutts, "Analysing, Profiling and Optimising Orthogona Persistence for Java", Proceedings of the Second International Workshop on Persistence and Java, Aug. 1997, XP-002443761.
Greg Holling, "Put Java in the Fast Lane", Javaworld.com, Aug. 2, 2002, http://www.javaworld.com/javaworld/jw-08-2002/jw-0802-performance.html.
Gustavo Rodriguez-Rivera, "Nonintrusive Cloning Garbage Collection with Stock Operating System Support", Software-Practice and Experience, vol. 27(8), Aug. 1997, XP-002443763.

* cited by examiner

*Primary Examiner*—Thomas Lee
*Assistant Examiner*—Abdou K Seye
(74) *Attorney, Agent, or Firm*—Park, Vaughan & Fleming LLP

(57) ABSTRACT

A system and method for dynamically and persistently tracking incremental profiling data in a process cloning application environment is presented. A master runtime system process is executed. A memory space of the master runtime system process is cloned as a child runtime system process responsive to a process request. The child runtime system process is executed. The execution of the child runtime system process is profiled by collecting profiling data incrementally. The child runtime system process profiles are fed back to the master runtime system process to benefit subsequent cloned child runtime system processes. In a further embodiment, the child runtime system process profiles are maintained in a persistent storage for use by the master runtime system process upon the next start up.

42 Claims, 10 Drawing Sheets

60

90

120

SYSTEM AND METHOD FOR DYNAMICALLY AND PERSISTENTLY TRACKING INCREMENTAL PROFILING DATA IN A PROCESS CLONING APPLICATION ENVIRONMENT

FIELD OF THE INVENTION

The invention relates in general to tracking profiling data and, in particular, to a system and method for dynamically and persistently tracking incremental profiling data in a process cloning application environment.

BACKGROUND OF THE INVENTION

Recent advances in microprocessor design and component integration have enabled a wide range of devices to offer increasingly complex functionality and "soft" features. Soft features include software applications that enhance and customize the operation of a device. These devices include standard computing devices, such as desktop and laptop computers, portable computing devices, such as personal data assistants, and consumer devices, such as cellular telephones, messaging pagers, gaming consoles, and set top boxes. Most devices now include an operating system to support the soft features and other extensions.

The increased capabilities offered by these software-upgradeable devices have also created certain user expectations. Often, users are not technically savvy and are intolerant of performance compromises occasioned by architectural challenges, such as slow or inconsistent application performance. Similarly, users generally expect to be able to access a host of separate applications, which are implemented at the system level through multitasking. For users, widely available software applications assure a positive experience through consistency and increased exposure across multiple platforms. However, for software developers, engineering software applications for disparate computing platforms entails increased development costs and on-going support and upgrade commitments for each supported architecture.

Managed code platforms provide one solution to software developers seeking to support multiple platforms by presenting a machine-independent and architecture-neutral operating environment. Managed code platforms include programming language compilers and interpreters executed by an operating system as user applications, but which provide virtual runtime environments within which compatible applications can operate. For instance, applications written in the Java programming language, when combined with a Java virtual machine (JVM) runtime environment, can operate on heterogeneous computer systems independent of machine-specific environment and configuration settings. An overview of the Java programming language is described in P. van der Linden, "Just Java," Ch. 1, Sun Microsystems, Inc. (2d ed. 1997), the disclosure of which is incorporated by reference. JVMs are a critical component to the overall Java operating environment, which can be ported to the full range of computational devices, including memory-constrained consumer devices.

Managed code platforms are generally designed for the monotonic execution of a single application instance. Multiple instances of a managed code platform are executed to simulate multitasking behavior. Such forced concurrency, however, creates several performance problems. First, each instance incurs a startup transient. Executable and startup data must be read from slow persistent storage, which results in slow initial application performance. Similarly, memory is not shared between instances and each additional instance increases the overall memory footprint of the platform by separately loading and instantiating classes, generally problematic in memory-constrained systems. Moreover, data dependencies and deferred initialization of system state can result in non-deterministic execution patterns. Finally, each instance independently determines the relative importance of executing methods and compiles machine code on an ad hoc basis, often causing inconsistent application performance.

One solution to providing concurrently executable managed code platforms involves designating a managed code platform that executes as a master process. Individual child managed code platform processes are spawned from the master process using process cloning and inherit runtime state from the master managed code platform. As a result, each child process benefits from the initialization actions completed by the master process.

Accurately selecting the initialization actions is important since the inherited runtime state directly affects the quality of memory sharing and savings, startup and warmup times saved by each child process, and whether execution determinism is improved. In one approach, initialization actions are chosen to improve child process performance by initializing the runtime state based on a priori knowledge of likely execution profile. For instance, commonly used methods can be precompiled or class loaders preemptively invoked to build inheritable, warmup state into the master process context. However, child process performance could be adversely affected if the underlying execution profile is poorly matched to real runtime conditions. For example, unused methods could be precompiled or incorrect classes could be loaded, thereby consuming processing and memory resources in the child process, which must also compile the methods and load the classes actually used. Similarly, the device usage patterns could change. As a result, a single set of initialization actions could inaccurately reflect the preferable set of actions best suited for different usage and execution scenarios and should instead be fine tuned either at startup or dynamically at runtime based on observed profile data.

Therefore, there is a need for profiling the execution and performance of cloned runtime system processes to measure actual usage patterns at runtime, particularly relative to pre-warmed state inherited from a master runtime system process. Preferably, such an approach would provide dynamically applicable feedback or persistently stored profile data, which could be executed by a master runtime system process at startup or runtime.

SUMMARY OF THE INVENTION

A managed code platform is executed in an application framework that supports the spawning of multiple and independent isolated user applications. Preferably, the application framework supports the cloning of the memory space of each user application using copy-on-write semantics. The managed code platform includes a master runtime system process, such as a virtual machine, to interpret machine-portable code defining compatible applications. An application manager also executes within the application framework and is communicatively interfaced to the master runtime system process through an inter-process communication mechanism. The application framework logically copies the master runtime system process context upon request by the application framework to create a child runtime system process through process cloning. The context of the master runtime system process stored in memory is inherited by the child runtime system process as prewarmed state and cached code. When implemented with copy-on-write semantics, the process cloning creates a logical copy of references to the master runtime system process context. Segments of the referenced master runtime system process context are lazily copied only upon an attempt by the child runtime system process to modify the referenced context. At runtime, each child runtime system process profiles an application to create incremental profile data, which can be transiently staged in a memory buffer or persistently stored in a file. The application manager retrieves and analyzes the incremental profile data and updates a master warmup program. The master runtime system process executes the updated master warmup program either upon initialization or in response to a command from the application manager to dynamically reinitialize the context. An example of a suitable managed code platform and runtime system process are the Java operating environment and Java virtual machine (JVM) architecture, as licensed by Sun Microsystems, Inc., Palo Alto, Calif.

One embodiment provides a system and method for dynamically and persistently tracking incremental profiling data in a process cloning application environment. A master runtime system process is executed. A memory space of the master runtime system process is cloned as a child runtime system process responsive to a process request. The child runtime system process is executed. The execution of the child runtime system process is profiled by collecting profiling data incrementally. The child runtime system process profiles are fed back to the master runtime system process to benefit subsequent cloned child runtime system processes. In a further embodiment, the child runtime system process profiles are maintained in a persistent storage for use by the master runtime system process upon the next start up.

The use of the process cloning mechanism provided by the underlying application framework provides several benefits in addition to resolving the need for efficient concurrent application execution of machine portable code. The inheritance of prewarmed state through the cloning of the master runtime process context provides inter-process sharing of pre-computed, pre-warmed state. Similarly, each child runtime system process executes in isolation of each other process, thereby providing strong resource control through the system level services of the application framework. Isolation, reliable process invocation and termination, and resource reclamation are available and cleanly provided at an operating system level. In addition, process cloning provides fast user application initialization and deterministic runtime behavior, particularly for environments providing process cloning with copy-on-write semantics. Finally, for non-shareable segments of the master runtime system process context, actual copying is deferred until required through copy-on-write semantics, which avoids impacting application performance until, and if, the segment is required.

Still other embodiments of the invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the invention. Accordingly, the drawings and detailed description are to be regarded as illustrative in nature and not as restrictive.

DETAILED DESCRIPTION

System Overview

Figure 1:
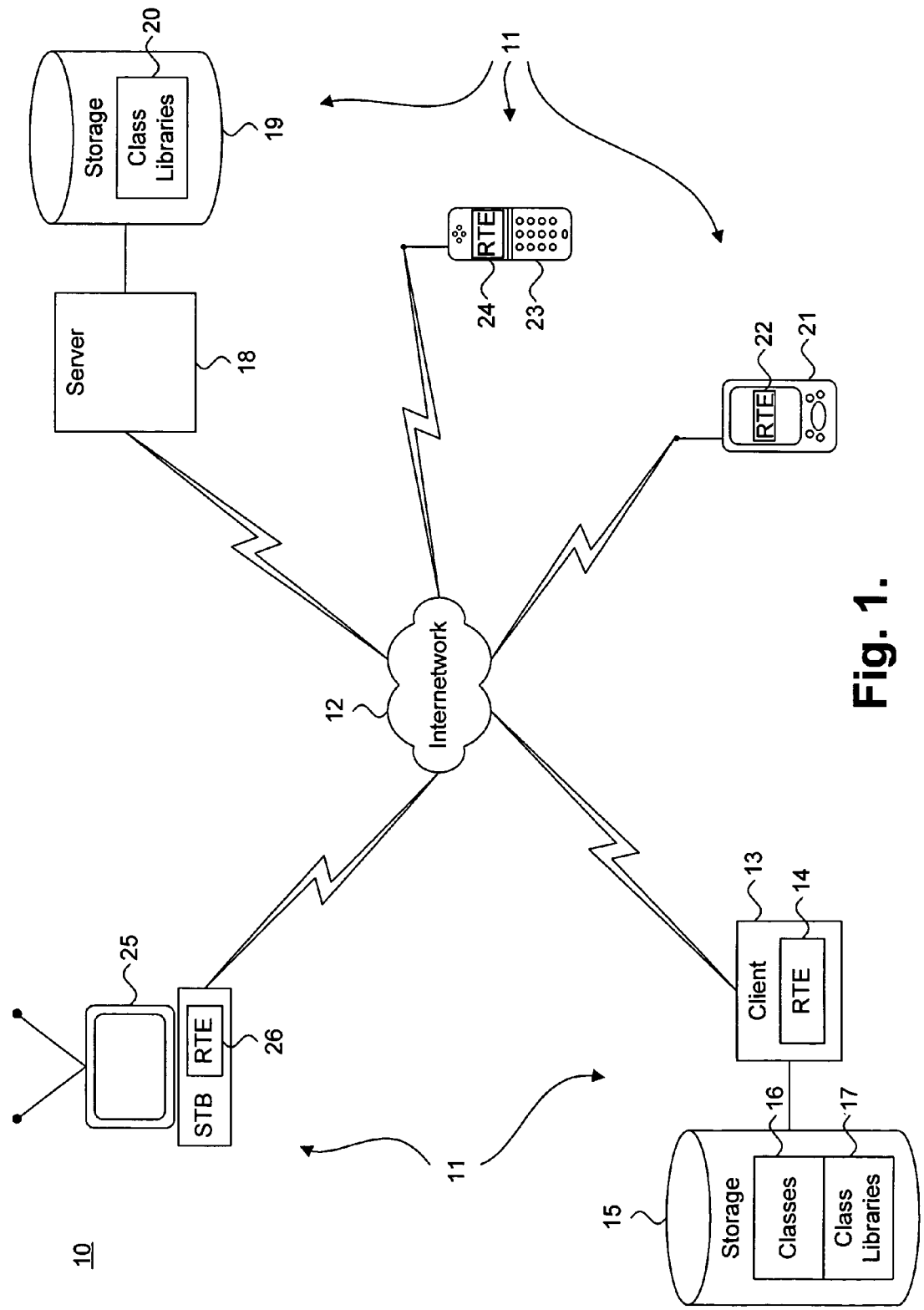
FIG. 1 is a functional block diagram showing, by way of example, runtime environments implemented on a plurality of heterogeneous devices.

FIG. 1 is a functional block diagram 10 showing, by way of example, runtime environments (RTEs) 14, 22, 24, 26 implemented on a plurality of heterogeneous devices 11. Each heterogeneous device 11 provides a managed code platform, such as the Java operating environment, executing in a runtime environment 14, 21, 24, 26, as further described below with reference to FIG. 2. The heterogeneous devices 11 include, nonexclusively, a client computer system 13, such as a desktop or laptop computer system. Each client 13 is operatively coupled to a storage device 15 and maintains a set of classes 16 and class libraries 17, which respectively define code modules that specify data structures and sets of methods that operate on the data, and shareable collections of the modules. The heterogeneous devices 11 also include portable computing devices, including personal data assistants 21, and consumer devices, such as cellular telephones 23 and set top boxes (STB) 25. Finally, a server 18 is operatively coupled to a storage device 19 in which globally shareable class libraries 20 are maintained. Each of the heterogeneous devices 11 can interface via a network 12, which includes conventional hardwired and wireless network configurations. Other types of heterogeneous devices 11 and various network configurations, arrangements, and topologies are possible.

Each heterogeneous device 11 includes an operating system to manage resources, provide access to peripheral devices, allocate memory resources, and control program execution and termination. Each operating system supports a process cloning mechanism that spawns multiple and independent isolated user applications by cloning the memory space of specifiable processes. An example of a process cloning mechanism suitable for use in the present invention is the fork( ) system call provided by the Unix or Linux operating systems, such as described in M. J. Bach, "The Design Of The Unix Operating System," Ch. 7, Bell Tele. Labs., Inc. (1986), the disclosure of which is incorporated by reference. The process invoking the fork( ) system call is known as the parent process and the newly created process is called the child process. The operating system assigns a separate process identifier to the child process, which executes as a separate process. The operating system also creates a logical copy of the context of the parent process by copying the memory space of the parent process into the memory space of the child process. In a copy-on-write variant of the fork( ) system call, the operating system only copies references to the memory space and defers actually copying individual memory space segments until, and if, the child process attempts to modify the referenced data of the parent process context. The copy-on-write fork( ) system call is faster than the non-copy-on-write fork( ) system call and implicitly shares any data not written into between the parent and child processes.

System for Dynamically Tracking Profiling Data Incrementally

Figure 2:
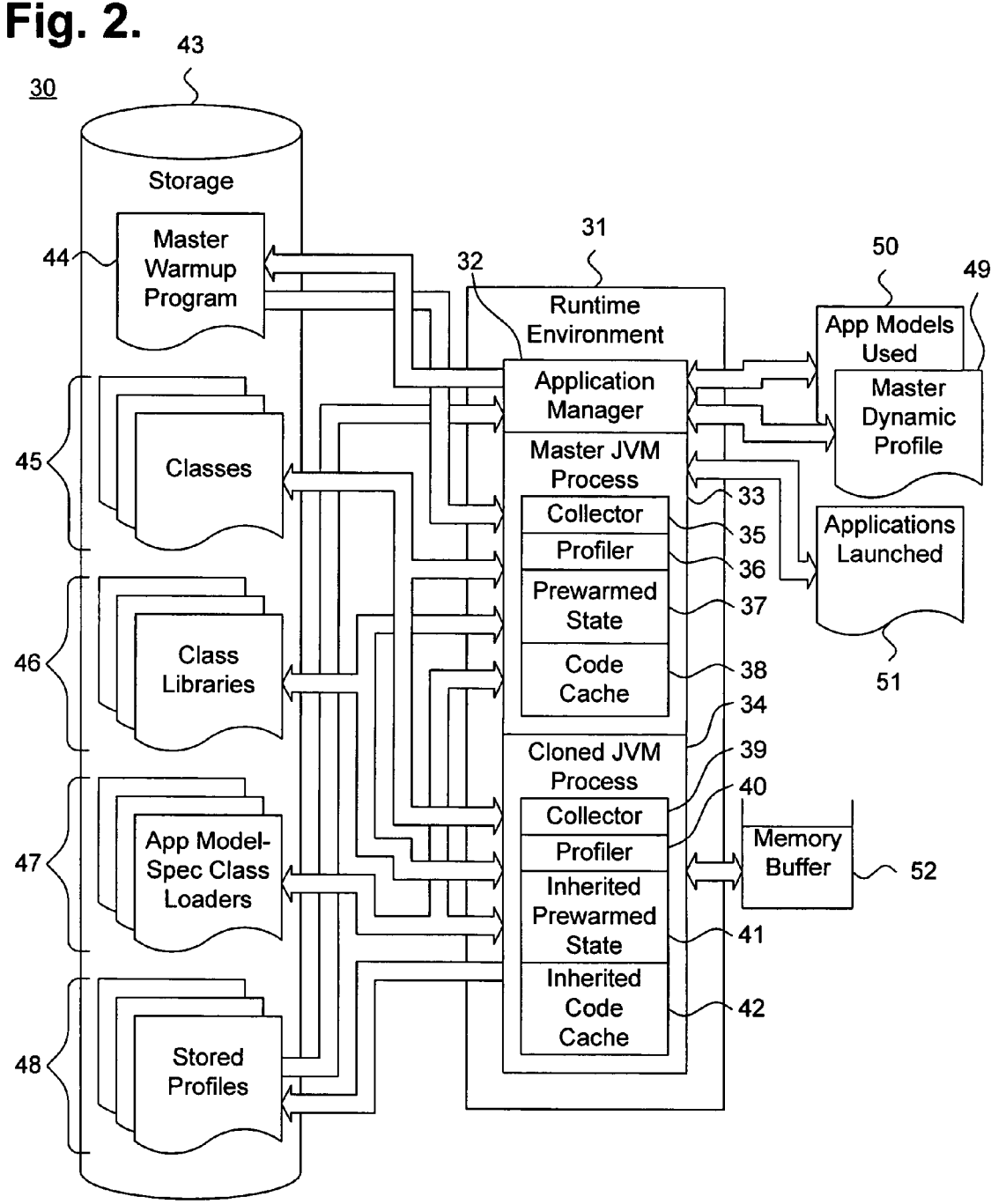
FIG. 2 is a block diagram showing a system for dynamically and persistently tracking incremental profiling data in a process cloning application environment, in accordance with the invention.

FIG. 2 is a block diagram 30 showing a system for dynamically and persistently tracking incremental profiling data in a process cloning application environment 34, in accordance with the invention. The system consists of a runtime environment 31 and individual classes 45 and class libraries 46 that form the overall core managed code platform. By way of example, the system is described with reference to the Java operating environment, although other forms of managed code platforms that execute applications preferably written in an object oriented programming language, such as the Java programming language, could also be used.

The exemplary runtime environment 31 includes an application manager 32, master Java virtual machine (JVM) process 33 and zero or more cloned JVM processes 34. The master JVM process 33 and cloned JVM processes 34 respectively correspond to a master runtime system process and child runtime system processes. The master runtime system process, preferably provided as a virtual machine, interprets machine-portable code defining compatible applications.

The runtime environment 31 executes an application framework that spawns multiple independent and isolated user application process instances by preferably cloning the memory space of a master runtime system process. The example of an application framework suitable for use in the present invention is the Unix operating system, such as described generally in M. J. Bach, supra at Ch. 2, the disclosure of which is incorporated by reference.

The application manager 32 presents a user interface through which individual applications can be selected and executed. The application manager 32 and master JVM process 33 preferably communicate via an inter-process communication (IPC) mechanism, such as a pipe or a socket. The master JVM process 33 is started at device boot time.

Upon initialization, the master JVM process 33 reads an executable process image from the storage device 43 and performs bootstrapping operations specified in a master warmup program 44. The master warmup program 44 is an executable program performing a full range of operations and specifying warmup initialization actions, including preloading classes 45 and classes defined in the class libraries 46, precompiling methods, and executing static initialization methods, such as respectively described in commonly-assigned U.S. patent application Ser. No. 10/745,023, entitled "System And Method For Dynamic Preloading Of Classes Through Memory Space Cloning Of A Master Runtime System Process," filed 22 Dec. 2003, pending; Ser. No. 10/745,020, entitled "System And Method For Providing Precompiled Code Through Memory Space Cloning Of A Master Runtime System Process," filed 22 Dec. 2003, abandoned; and issued U.S. Pat. No. 7,124,291, entitled "System And Method For Eliminating Static Initialization Overhead By Memory Space Cloning Of A Master Runtime System Process," filed 22 Dec. 2003; the disclosures of which are incorporated by reference. Thus, upon completion of initialization, the memory image of the master JVM process 33 resembles that of an initialized, primed and warmed up JVM process with key classes, methods and initialized state stored in the master JVM process context.

Following the initialization, the master JVM process 33 idles, that is, "sleeps" in an inactive state, while awaiting further instructions from the application manager 32. The master JVM process 33 awakens in response to requests received from the application manager 32 to execute applications. The application manager 32 sends a request to the master JVM process 33, including standard command line parameters, such as application name, class path, and application arguments. The master JVM process 33 awakens and creates a cloned JVM process 34 as a new cloned process instance of the master JVM process 33 using the process cloning mechanism of the underlying operating system. The context of the master JVM process 33 stored in memory as prewarmed state 37 is inherited by the cloned JVM process 34 as inherited prewarmed state 41, thereby saving initialization and runtime execution times and providing deterministic execution behavior. Following the "cloning" of the cloned JVM process 34, the master JVM process 33 records the launched application in an applications launched list 51 and returns to an inactive sleep state.

When implemented with copy-on-write semantics, the process cloning creates a logical copy of only the references to the master JVM process context. Segments of the referenced master JVM process context are lazily copied only upon an attempt by the cloned JVM process to modify the referenced context. Therefore, as long as the cloned JVM process does not write into a memory segment, the segment remains shared between parent and child processes.

The master JVM process 33 recognizes the following basic commands received from the application manager 32 through the IPC mechanism:

(1) list: Provides a list of applications launched in response to requests received from the application manager 32.

(2) jexec: Invokes the process cloning mechanism, parses command line arguments and executes a new instance of the master JVM process 33 as the cloned JVM process 34. Preferably adopts a syntax compatible to standard JVM processes.

(3) kill: Terminates the application identified by an application handle or process identifier.

(4) source: Parses arguments and executes a program in the body of the master JVM process 33 without creating a cloned JVM process 34. Subsequently cloned JVM processes 34 inherit the refined memory state of the master JVM process 33 resulting from the execution of a source command on behalf of the master JVM process 33.

Other commands are possible.

At device boot time, the master JVM process 33 executes the master warmup program 44 and the prewarmed state 37 and compiled method code in the code cache 38 are inherited by each cloned JVM process 34 as inherited prewarmed state 41 and inherited compiled method code in the inherited code cache 42. The master warmup program 44 is executed by the application manager 32 based on persistent profile data previously retrieved and stored from profile collectors 39 executing in one or more previously executed cloned JVM processes 34. Also, each profile collector 39 collects and stores incremental profile data generated by a profiler 40 executing in one or more cloned JVM processes 34. The dynamically profiled data is polled regularly by the application manager 32 to create a master dynamic profile 49, which is fed back into the master JVM process 33 using the source command to benefit subsequent cloned JVM processes 34. The master dynamic profile 49 also forms the basis of a persistent profile that can be used by the master JVM process 33 upon the next device boot.

Each profiler 40 performs accounting on applications being executed, as would be appreciated by one skilled in the art. The profiler 40 continually evaluates the application execution through, for example, an interpretive loop that attempts to identify important and performance sensitive code segments in the application. By way of example, the profiler 40 identifies method invocations and system library calls through the accounting, which includes counting loop iterations and method invocations and by sampling running methods. Other forms and approaches to performing accounting are possible. Preferably, the profiler 40 applies a threshold to the data collected through profiling and identifies those methods exceeding the threshold. The profile collector 39 evaluates the actions performed by the profiler 40 and stores those events affecting performance, such as class initializations and methods selected for dynamic compilation, as profile data. Other types and forms of profile data are possible.

In one embodiment, the profile collector 35 of each cloned JVM process 34 stores the collected profile data transiently in a memory buffer 52. Each cloned JVM process 34 maintains a profile request listener thread (not shown) executing concurrently to a main execution thread (also not shown). The application manager 32 accesses the profile request listener thread using a suitable IPC mechanism, such as a socket. At runtime, the cloned JVM process 34 listens to the profile thread through which the application manager 32 periodically sends profiling data queries, such as polling requests. In response, the cloned JVM process 34 sends incremental profile data to the application manager 32 and resets the memory buffer 52. Only the profile data incrementally collected since the last profiling data query is staged in the memory buffer 52 and the application manager 32 stores assimilated sets of incremental profile data in the master dynamic profile 49.

In a further embodiment, the profile collector 35 of each cloned JVM process 34 stores the collected profile data persistently in a file as stored profiles 48. At runtime, the application manager 32 iterates over the incremental profile data in the stored profiles 48, preferably on a periodic basis, for events of interest and stores evaluated incremental profile data in the master dynamic profile 49. The incremental profile data can also be stored in both as transient profile data in the memory buffer 52 and as persistent profile data in the stored profiles 48.

At runtime, the application manager 32 maintains the master dynamic profile 49, which assimilates the incremental profile data received from each cloned JVM process 32. The master dynamic profile 49 reflects dynamically observed events of interest, such as class initializations and methods selected for dynamic compilation. This data can be used to fine tune the warmup initialization actions executed by the master JVM process 33 upon initialization to reflected actual usage patterns at runtime. Thus, the application manager 32 analyzes the master dynamic profile 49 and updates the master warmup program 44. In one embodiment, the application manager 32 persistently stores the master warmup list 44 as a file in the storage device 43 at device shutdown or on a periodic basis, such as in response to an automatic save feature. Thereafter, at device boot time, the master JVM process 33 executes the saved master warmup program 44, which reflects the latest observed usage patterns. The prewarmed state 37 and compiled method code in the code cache 38 are then inherited by each cloned JVM process 34 as inherited prewarmed state 41 and inherited compiled method code in the inherited code cache 42.

In a further embodiment, the application manager 32 dynamically feeds the incremental profile data to the master JVM process 33. The master JVM process 33 recognizes an additional basic source commands received from the application manager 32 through the IPC mechanism, such as described in issued U.S. Pat. No. 7,343,603, entitled "System And Method For Performing Incremental Initialization Of A Master Runtime System Process," filed 22 Dec. 2003, the disclosure of which is incorporated by reference. Briefly, executing a source command on the master JVM process 33 allows the warmup state, that is, the prewarmed state 37 and code cache 38, to be incrementally initialized. The application manager 32 sends the master warmup program 44 to the master JVM process 33 using the source command, which is executed to refine the context of the master JVM process 33. Each subsequently spawned cloned JVM process 33 inherits the then-warmed up context as inherited prewarmed state 43 and code cache 38 executed by the master JVM process 33 up to that time.

Master JVM Process Mapping

Figure 3:
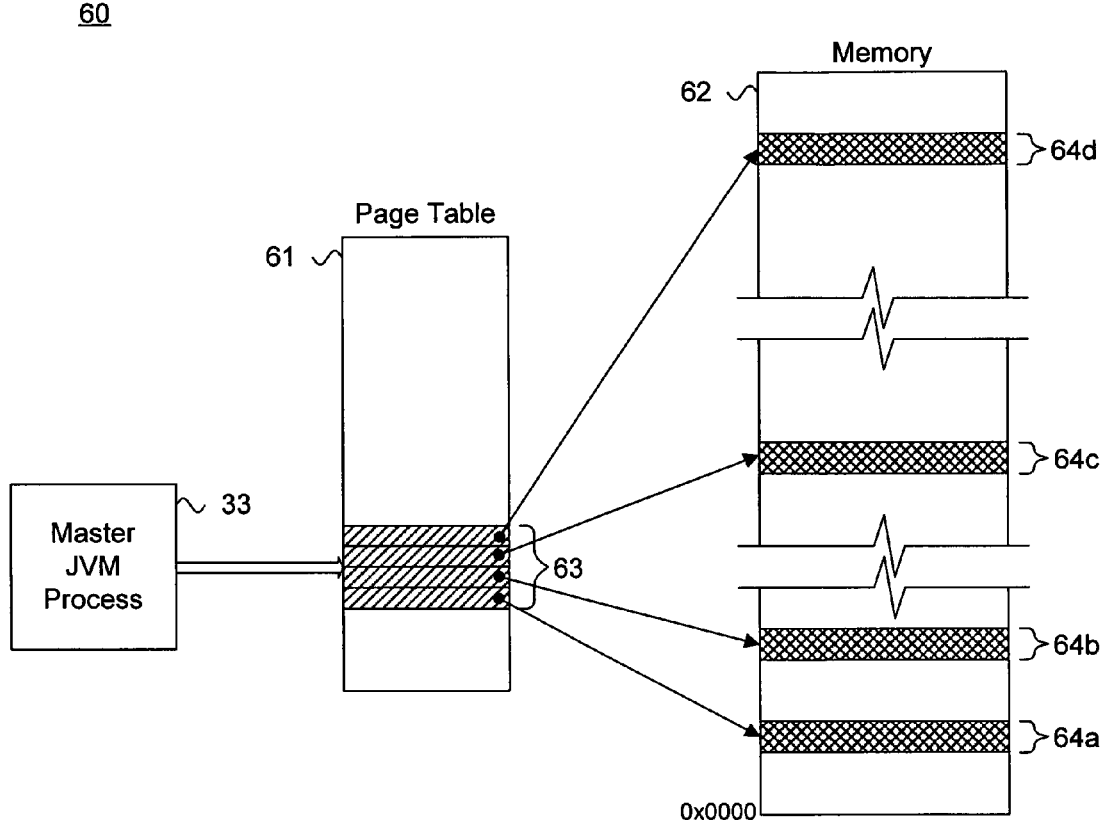
FIG. 3 is a block diagram showing, by way of example, a master JVM process mapped into memory.

FIG. 3 is a block diagram 60 showing, by way of example, a master JVM process 33 mapped into memory 62. Generally, the context for an executing process includes a data space, user stack, kernel stack, and a user area that lists open files, current directory and supervisory permission settings. Other types of context can also be provided. The context is stored and managed in the memory 62 by the operating system. At device boot time, the operating system instantiates a representation of the executable master JVM process 33 into the memory 62, possibly in non-contiguous pages 64a-d, and records the allocation of the memory space as page table entries 63 into the page table 61 prior to commencing execution of the master JVM process 33. As well, the master JVM process context could similarly be mapped using other memory management systems, such as using demand paging, swapping and similar process memory allocation schemes compatible with process cloning, particularly process cloning with copy-on-write semantics.

Cloned JVM Process Mapping

Figure 4:
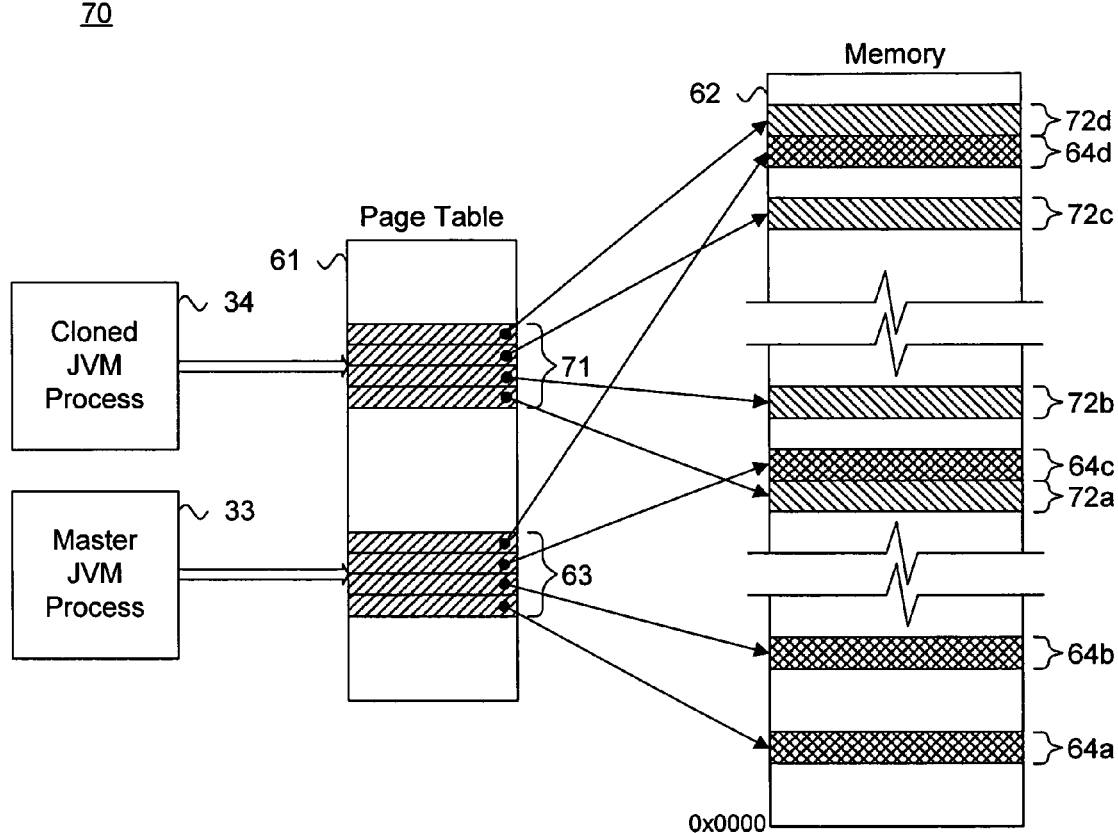
FIG. 4 is a block diagram showing, by way of example, a master JVM process and a cloned JVM process mapped into memory through memory space cloning.

FIG. 4 is a block diagram 70 showing, by way of example, a master JVM process 33 and a cloned JVM process 34 mapped into memory 62 through memory space cloning. In a system with process cloning that does not provide copy-on-write semantics, physical copies of the pages 64a-c in the memory 62 storing the parent process context are created for each child process. In response to a process cloning request, the operating system instantiates a copy of the representation of the executable master JVM process 33 for the cloned JVM process 34 into the memory 62, possibly in non-contiguous pages 72a-d, and records the allocation of the memory space as page table entries 71 into the page table 61 prior to commencing execution of the cloned JVM process 34. Thus, the cloned JVM process 34 is created with a physical copy of the context of the master JVM process 33. Since a new, separate physical copy of the master JVM process context is created, the cloned JVM process 34 inherits the prewarmed state 37, including the preloaded classes of the master JVM process 33. However, the overall memory footprint of the runtime environment 31 is increased by the memory space required to store the additional copy of the master JVM process context.

Cloned JVM Process Mapping with Copy-on-Write

Figure 5A:
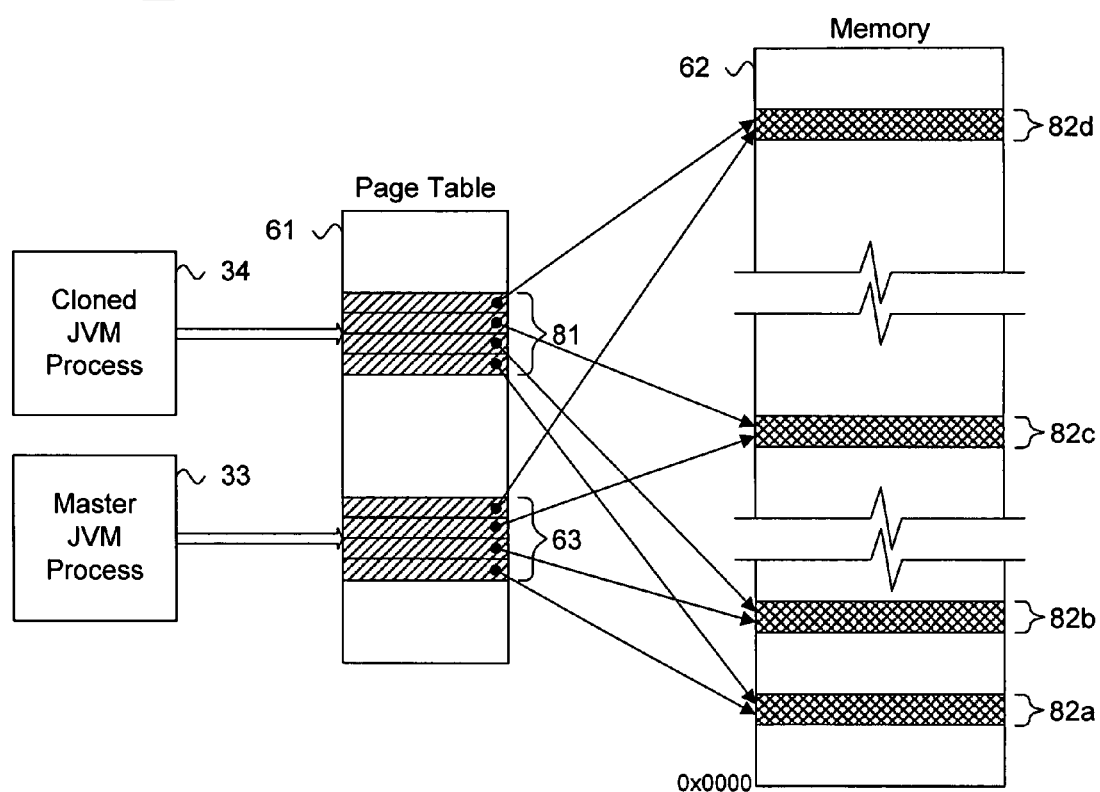
FIGS. 5A-B are block diagrams showing, by way of example, a master JVM process and a cloned JVM process mapped into memory through memory space cloning with copy-on-write semantics.
Figure 5B:
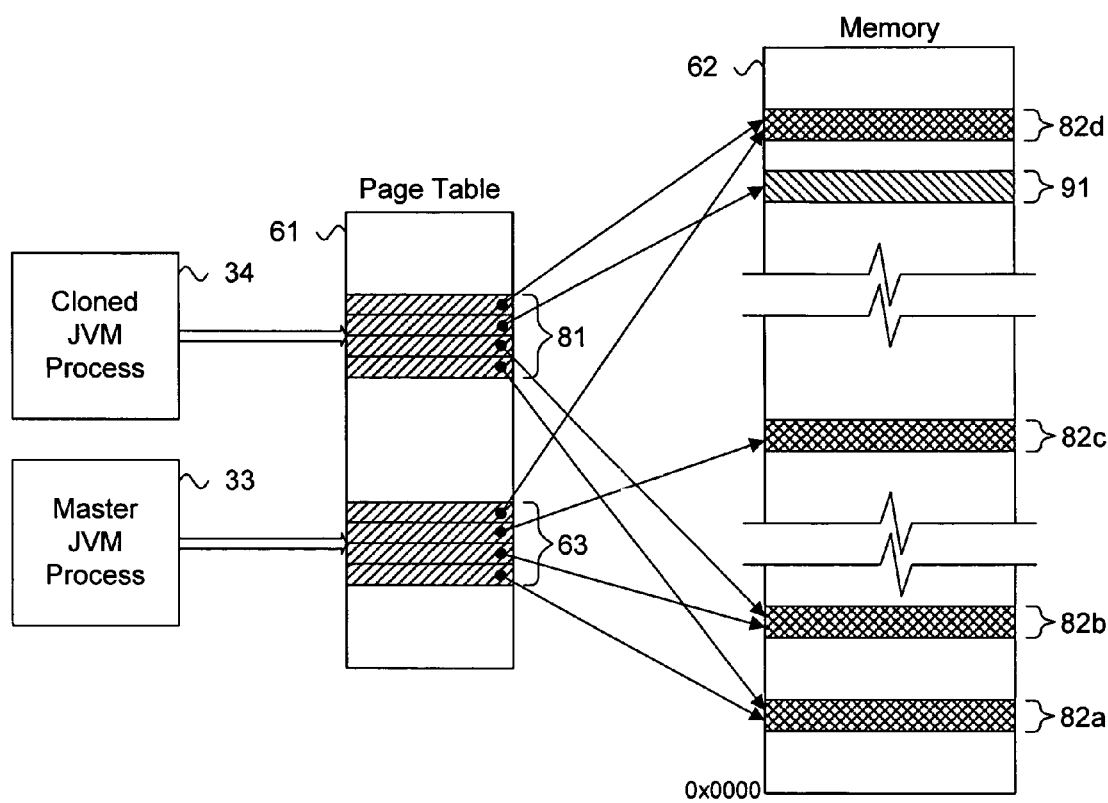

FIGS. 5A-B are block diagrams 80, 90 showing, by way of example, a master JVM process 33 and a cloned JVM process 34 mapped into memory 62 through memory space cloning with copy-on-write semantics. In a system with process cloning that provides copy-on-write semantics, only copies of the references, typically page table entries, to the memory space storing the parent process context are created for each child process. Referring first to FIG. 5A, in response to a process cloning request, the operating system copies only the page table entries 63 referencing the memory space of the executable master JVM process 33 as a new set of page table entries 81 for the cloned JVM process 34. Thus, the cloned JVM process 34 uses the same references to the possibly non-contiguous pages 64a-d storing the master JVM process context as the master JVM process 34. Initialization and execution of the application associated with the cloned JVM process 34 requires less time, as only the page table entries 62 are copied to clone the master JVM process context. Furthermore, until the cloned JVM process 34 attempts to modify the master JVM process context, the memory space is treated as read only data, which can be shared by other processes.

Referring next to FIG. 5B, the cloned JVM process 34 has attempted to modify one of the pages 82c in the memory space of the master JVM process context. In response, the operating system creates a physical copy of the to-be-modified memory space page 82c as a new page 91 and updates the allocation in the page table entries 81 for the cloned JVM process 34. Through copy-on-write semantics, the overall footprint of the runtime environment 31 is maintained as small as possible and only grows until, and if, each cloned JVM process 34 actually requires additional memory space for application-specific context.

Method for Dynamically Tracking Profiling Data Incrementally

Figure 6:
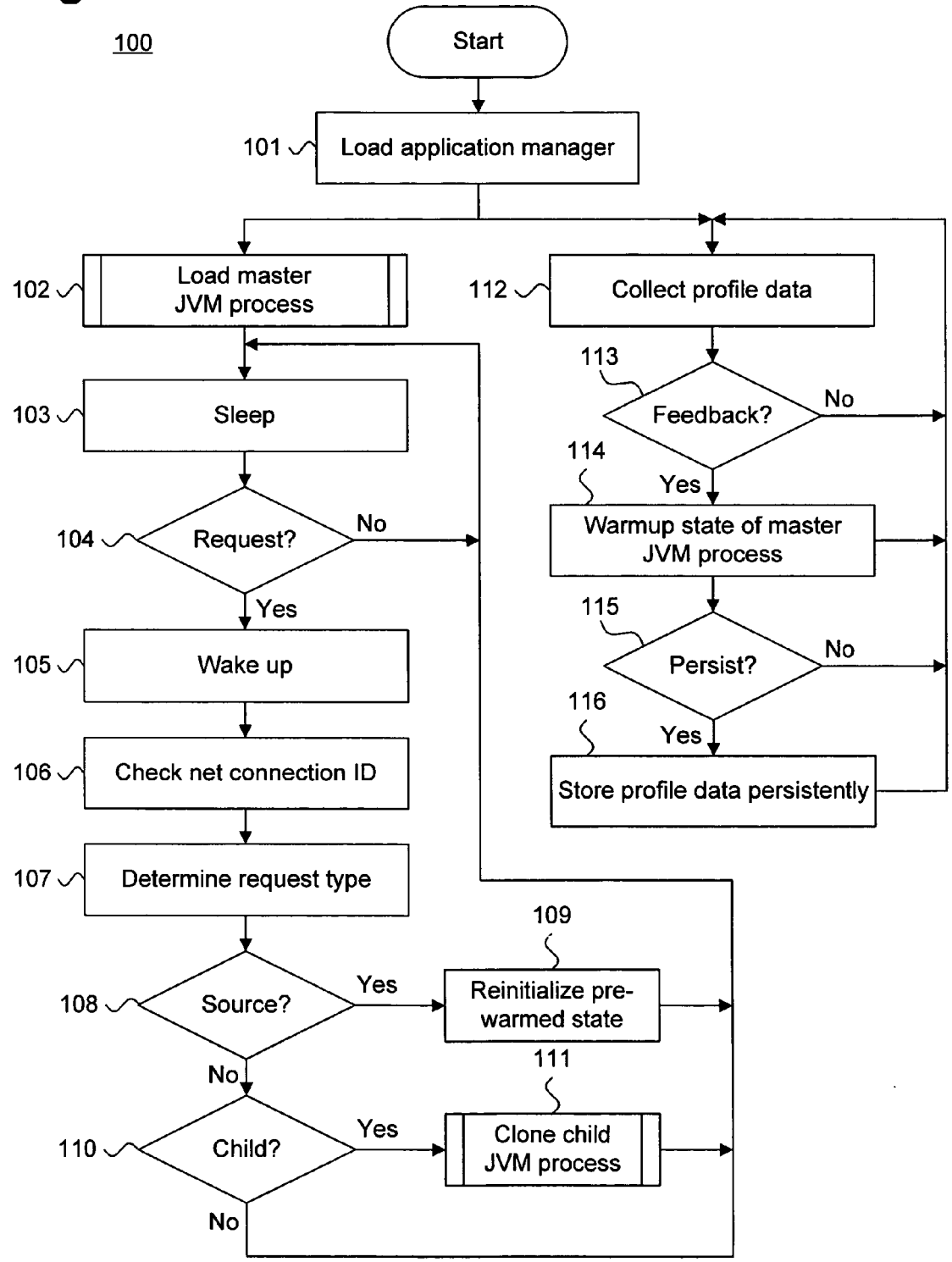
FIG. 6 is a flow diagram showing a method for dynamically and persistently tracking incremental profiling data in a process cloning application environment, in accordance with the invention.

FIG. 6 is a flow diagram, showing a method 100 for dynamically and persistently tracking incremental profiling data in a process cloning application environment, in accordance with the invention. The method 100 is described as a sequence of process operations or steps, which can be executed, for instance, by the runtime environment 31 of FIG. 2 or other components.

Initially, the application manager 32 is loaded (block 101). The master JVM process 33 is loaded and initialized at device boot time (block 102), as further described below with reference to FIG. 7. Following loading and initialization, the master JVM process 33 enters an inactive sleep mode (block 103). Upon receiving a request from the application manager 32 (block 104), the master JVM process 33 awakens (block 105). If necessary, the master JVM process 33 checks the network connection identifier (ID) (block 106) for the application manager 32 and determines the type of request (block 107). The master JVM process 33 recognizes the commands list, jexec, source, and kill, as described above with reference to FIG. 2. If the request type corresponds to a source command, instructing the master JVM process 33 to execute the master warmup program 44 (block 108), the master JVM 33 executes the master warmup program 44 (block 109), which refines or "enriches" the prewarmed state of the master JVM process 33, such that subsequently cloned JVM processes 34 spawned from the master JVM process 33 will inherit the refined context. If the request type corresponds to ajexec command, instructing the master JVM process 33 to initiate an execution of an application through process cloning (block 110), a cloned JVM process 34 is cloned and executed (block 111), as further described below with reference to FIGS. 8 and 9.

Concurrently, the application manager 32 collects the profile data from the memory buffer 52 or stored profiles 48 (block 112). Each profile collector 39 collects and stores incremental profile data generated by a profiler 40 executing in one or more cloned JVM processes 34. The dynamically profiled data is polled regularly by the application manager 32 to create the master dynamic profile 49, which is fed back into the master JVM process 33 using the source command (block 108) to benefit subsequent cloned JVM processes 34. Thus, if the master JVM process 33 is to be updated through feedback of incremental profile data (block 113), the application manager 32 warms up the master JVM process state by sending a source command (block 114). The master dynamic profile 49 also forms the basis of a persistent profile that can be used by the master JVM process 33 upon the next device boot. If maintained persistently (block 115), the master dynamic profile 49 is stored persistently, such as in a file (block 116). Processing continues indefinitely until the application manager 32, master JVM process 33, and the runtime environment 31 are terminated.

Routine for Loading Master JVM Process

Figure 7:
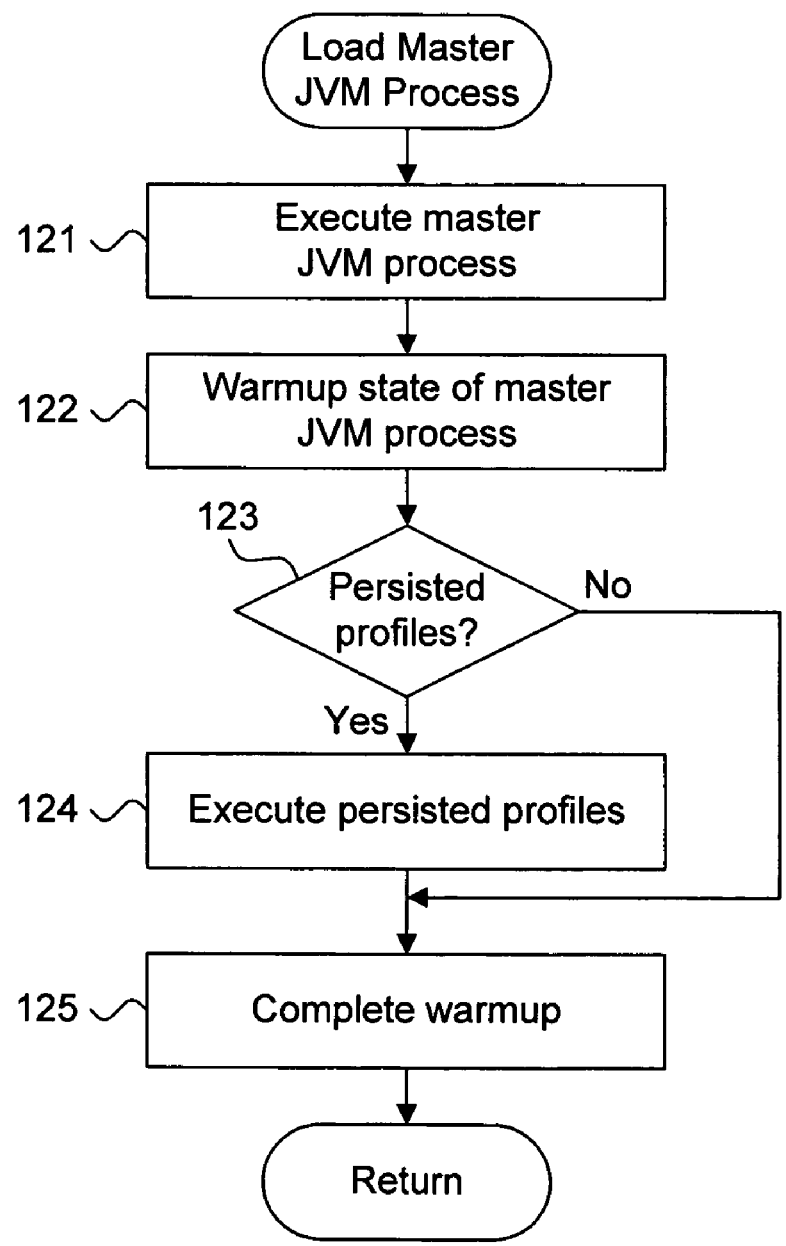
FIG. 7 is a flow diagram showing the routine for loading a master JVM process for use in the method of FIG. 6.

FIG. 7 is a flow diagram showing the routine 120 for loading a master JVM process 33 for use in the method 100 of FIG. 6. One purpose of the routine is to invoke the master JVM process 33 and to warmup the master JVM process state for inheritance by cloned JVM processes 34.

Initially, the master JVM process 33 begins execution at device boot time (block 121). The master JVM process 33 executes two sets of warmup actions using the master warmup program 44 and the master dynamic profile 49. The master warmup program 44 is static and does not generally change between device boots, whereas the master dynamic profile 49 is subject to continual change based on the incremental profile data collected and assimilated by the application manager 32. First, the master JVM process 33 executes the master warmup program 44 to form a memory image that resembles that of an initialized, primed and warmed up JVM process with key classes, methods and initialized state stored in the master JVM process context (block 122). Second, if the application manager 32 maintains the master dynamic profile 49 persistently (block 123), the master JVM process 33 retrieves and executes the master dynamic profile 49 (block 124). The master JVM process 33 then completes any other warmup operations (block 125) and the routine returns.

Routine for Process Cloning without Copy-on-Write

Figure 8:
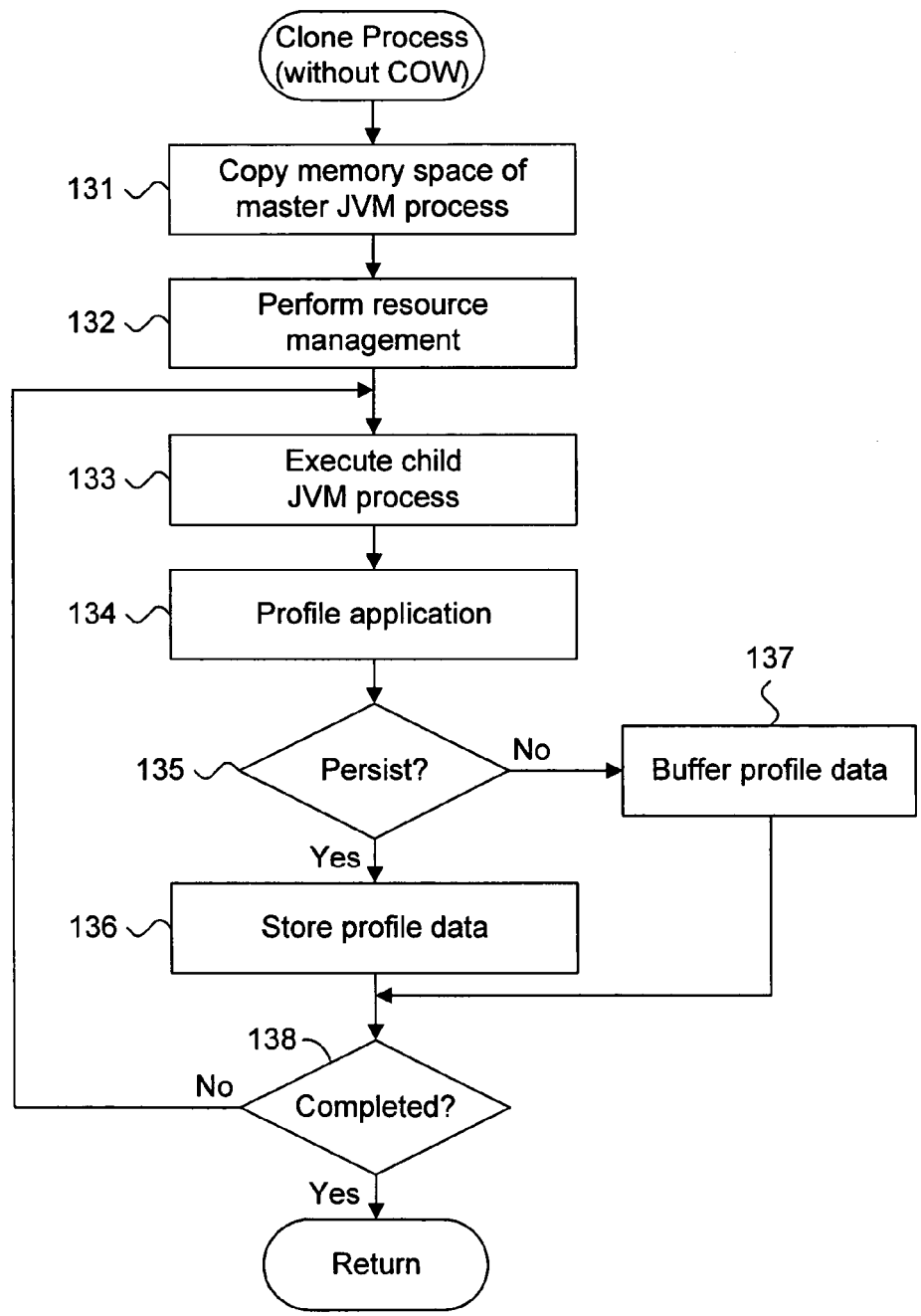
FIG. 8 is a flow diagram showing the routine for cloning a process without copy-on-write semantics for use in the method of FIG. 6.

FIG. 8 is a flow diagram showing the routine 130 for cloning a process without copy-on-write for use in the method 100 of FIG. 6. One purpose of the routine is to create and initiate execution of a cloned JVM process 34 through process cloning that does not provide copy-on-write semantics.

Initially, the memory space containing the context of the master JVM process 33 is physically copied into a new memory space for the cloned JVM process 34 (block 131). Optionally, the master JVM process 33 can set operating system level resource management parameters over the cloned JVM process 34 (block 132), including setting scheduling priorities and limiting processor and memory consumption. Other types of resource management controls are possible. The cloned JVM process 34 is then executed by the runtime environment 31 (block 133) using the duplicated master JVM process context. During execution, the cloned JVM process 34 profiles the application to create incremental profile data (block 134). If the incremental profile data is stored persistently (block 135), the cloned JVM process 34 stores the incremental profile data as stored profiles 48 (block 136). Otherwise, the incremental profile data is transiently staged in the memory buffer 52 (block 137). The routine returns upon the completion (block 138) of the cloned JVM process 34.

Routine for Process Cloning with Copy-on-Write

Figure 9:
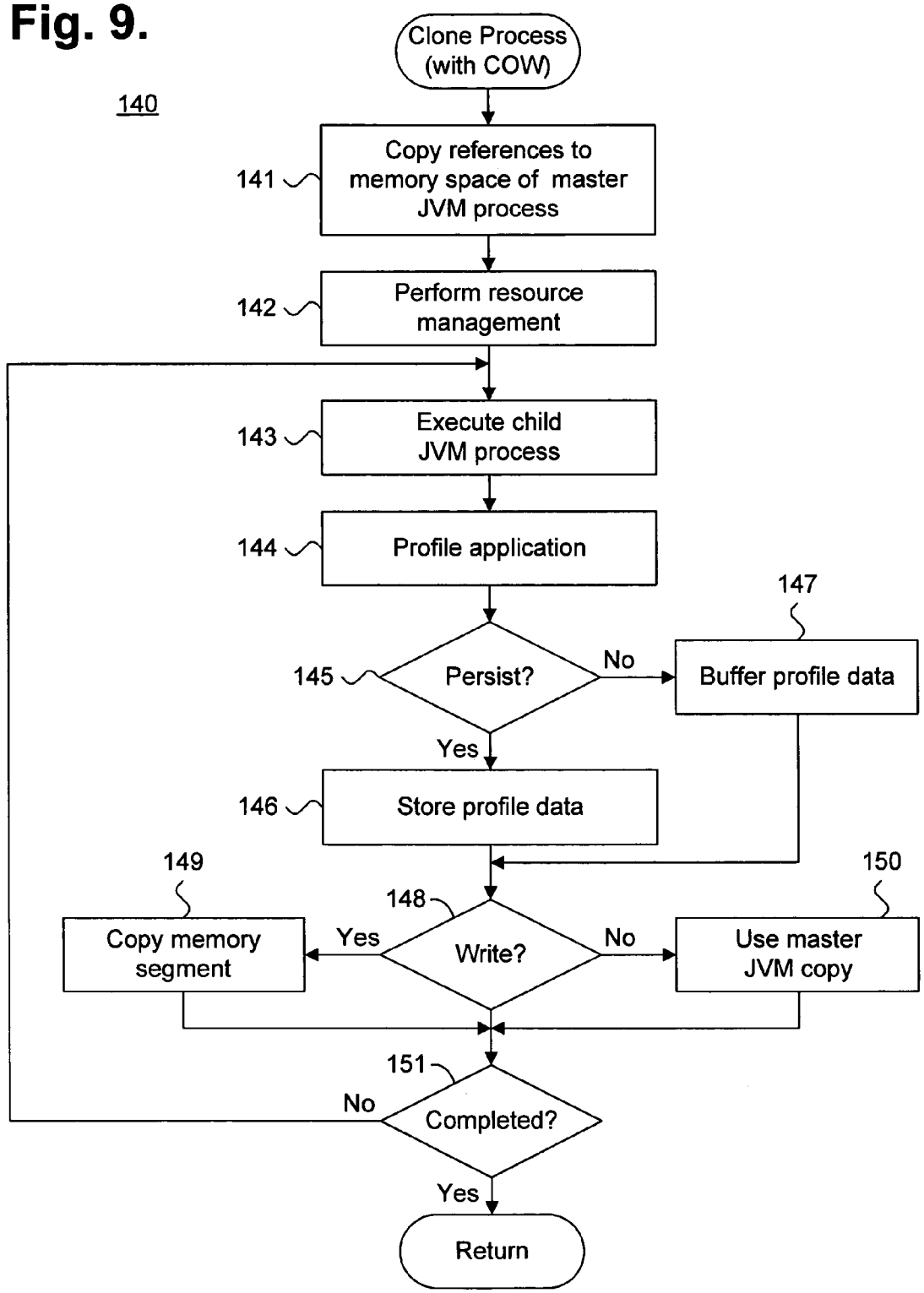
FIG. 9 is a flow diagram showing the routine for cloning a process with copy-on-write semantics for use in the method of FIG. 6.

FIG. 9 is a flow diagram showing the routine 140 for cloning a process with copy-on-write for use in the method 100 of FIG. 6. One purpose of the routine is to create and initiate execution of a cloned JVM process 34 through process cloning that provides copy-on-write semantics.

Initially, references to the memory space containing the context of the master JVM process 33 are copied for the cloned JVM process 34 (block 141). Optionally, the master JVM process 33 can set operating system level resource management parameters over the cloned JVM process 34 (block 142), including setting scheduling priorities and limiting processor and memory consumption. Other types of resource management controls are possible. The cloned JVM process 34 is then executed by the runtime environment 31 (block 143) using the referenced master JVM process context. During execution, the cloned JVM process 34 profiles the application to create incremental profile data (block 144). If the incremental profile data is stored persistently (block 145), the cloned JVM process 34 stores the incremental profile data as stored profiles 48 (block 146). Otherwise, the incremental profile data is transiently staged in the memory buffer 52 (block 147). Each time the cloned JVM process 34 attempts to write into the memory space referenced to the master JVM process context (block 148), the operating system copies the applicable memory segment (block 149). Otherwise, the cloned JVM process 34 continues to use the referenced master JVM process context (block 150), which is treated as read only data. The routine returns upon the completion (block 151) of the cloned JVM process 34.

While the invention has been particularly shown and described as referenced to the embodiments thereof, those skilled in the art will understand that the foregoing and other changes in form and detail may be made therein without departing from the spirit and scope of the invention.

What is claimed is:

1. A system for dynamically and persistently tracking incremental profiling data in a process cloning application environment, comprising:
   a runtime environment to clone an initial memory space of an executing master runtime system process as a cloned memory space of a first child runtime system process responsive to a process request to execute and execute the first child runtime system process;
   a storage device which stores the memory space of the executing master runtime system process;
   a collector to profile the execution of the first child runtime system process by collecting profiling data incrementally,
   wherein the profiling data comprises only dynamically observed events of interest that reflect actual usage patterns at runtime; and
   wherein the profiling data is used to decrease the initialization and execution time or a second cloned child runtime process; and
   wherein the second cloned child runtime process is able to be associated with a different application than the first child runtime system process;
   a master warmup program to consolidate the profiling data; and
   a file manager to store the master warmup program, wherein the runtime environment retrieves the master warmup program, executes the master warmup program to warm up the initial memory space of the master runtime system process, and stores the warmed up initial memory space of the master runtime system process as the memory space of the master runtime system process in the storage device.

2. A system according to claim 1, further comprising:
   a memory buffer defined in a memory space of the first child runtime system process to store the profiling data transiently.

3. A system according to claim 2, wherein the runtime environment communicates the profiling data periodically from the memory buffer to an executing application manager process.

4. A system according to claim 3, further comprising:
   a profiling execution thread maintained with the application manager process in the first child runtime system process; and
   a response to provide the profiling data via the profiling execution thread responsive to a data request from the application manager process.

5. A system according to claim 4, wherein the profiling execution thread comprises an inter-process communication mechanism.

6. A system according to claim 3, wherein the profiling data is reset upon completing the communication to the application manager process.

7. A system according to claim 1, further comprising:
   a file to store the profiling data persistently at device shutdown or on a periodic basis.

8. A system according to claim 7, wherein the runtime environment communicates the profiling data from the file to an executing application manager process.

9. A system according to claim 1, further comprising:
   an application model comprising a representation of at least one class from a source definition provided as object-oriented program code and associated with the application model, wherein the child runtime process selects one such application model specific class loader instance, and the runtime environment communicates the application model selected by the child runtime system process to an executing application manager process.

10. A system according to claim 1, further comprising:
    the master warmup program defined as a source definition provided as object-oriented program code.

11. A system according to claim 10, further comprising:
    the file manager to store the master warmup program persistently in a file upon termination of the execution of an executing application manager process.

12. A system according to claim 11, wherein the runtime environment clones the memory space of the further master runtime system process as a further child runtime system process responsive to a process request, and executing the further child runtime system process.

13. A system according to claim 10, further comprising:
    an application manager program to dynamically update the master warmup program during execution of the master runtime system process, wherein the runtime environment executes the master warmup program to warm up the memory space of the master runtime system process, and stores the warmed up memory space of the master runtime system process as the memory space of the master runtime system process in the storage device.

14. A system according to claim 1, wherein the profiling data comprises data selected from the group comprising class initializations, and methods selected for dynamic compilation.

15. A system according to claim 1, further comprising:
a process cloning mechanism to instantiate the child runtime system process by copying the memory space of the master runtime system process into a separate memory space for the child runtime system process.

16. A system according to claim 1, further comprising:
a copy-on-write process cloning mechanism to instantiate the child runtime system process by copying references to the memory space of the master runtime system process into a separate memory space for the child runtime system process, and to defer copying of the memory space of the master runtime system process until the child runtime system process needs to modify the referenced memory space of the master runtime system process.

17. A system according to claim 1, wherein the master runtime system process is caused to sleep relative to receiving the process request.

18. A system according to claim 1, further comprising:
a resource controller to set operating system level resource management parameters on the child runtime system process.

19. A system according to claim 1, wherein the object-oriented program code is written in an object oriented programming language.

20. A system according to claim 19, wherein the master runtime system process and the child runtime system process are virtual machines.

21. A method for dynamically and persistently tracking incremental profiling data in a process cloning application environment, comprising:
executing a master runtime system process;
cloning a memory space of the master runtime system process as a first child runtime system process responsive to a process request and executing the first child runtime system process;
profiling the execution of the first child runtime system process by collecting profiling data incrementally,
wherein the profiling data comprises only dynamically observed events of interest that reflect actual usage patterns at runtime, and
wherein the profiling data is used to decrease the initialization and execution time of a second cloned child runtime process; and
wherein the second cloned child runtime process is able to be associated with a different application than the first child runtime system process:
consolidating the profiling data as a master warmup program;
storing master warmup;
executing a further master runtime system process;
retrieving the master warmup program; and
interpreting, instantiating and warming up the master warmup program into a memory space of the further master runtime system process.

22. A method according to claim 21, further comprising:
storing the profiling data transiently in a memory buffer defined in a memory space of the first child runtime system process.

23. A method according to claim 22, further comprising:
executing an application manager process; and
communicating the profiling data periodically from the memory buffer to the application manager process.

24. A method according to claim 23, further comprising:
maintaining a profiling execution thread with the application manager process in the first child runtime system process; and
providing the profiling data via the profiling execution thread responsive to a data request from the application manager process.

25. A method according to claim 24, wherein the profiling execution thread comprises an inter-process communication mechanism.

26. A method according to claim 23, further comprising:
resetting the profiling data upon completing the communication to the application manager process.

27. A method according to claim 21, further comprising:
storing the profiling data persistently in a file at device shutdown or on a periodic basis.

28. A method according to claim 27, further comprising:
executing an application manager process; and
communicating the profiling data from the file to the application manager process.

29. A method according to claim 21, further comprising:
specifying an application model comprising a representation of at least one class from a source definition provided as object-oriented program code and associated with the application model, wherein the child runtime process selects one such application model specific class loader instance;
executing an application manager process; and
communicating the application model selected by the child runtime system process to the application manager process.

30. A method according to claim 21, further comprising:
defining the master warmup program as a source definition provided as object-oriented program code.

31. A method according to claim 30, further comprising:
executing an application manager process;
storing the master warmup program persistently in a file upon termination of the execution of the application manager process.

32. A method according to claim 31, further comprising:
cloning the memory space of the further master runtime system process as a cloned memory space of a further child runtime system process responsive to a process request, and executing the further child runtime system process.

33. A method according to claim 30, further comprising:
dynamically updating the master warmup program during execution of the master runtime system process; and
interpreting, instantiating and warming up the master warmup program into the memory space of the master runtime system process.

34. A method according to claim 21, wherein the profiling data comprises data selected from the group comprising class initializations, and methods selected for dynamic compilation.

35. A method according to claim 21, further comprising:
instantiating the child runtime system process by copying the memory space of the master runtime system process into a separate memory space for the child runtime system process.

36. A method according to claim 21, further comprising:
instantiating the child runtime system process by copying references to the memory space of the master runtime system process into a separate memory space for the child runtime system process; and deferring copying of the memory space of the master runtime system process until the child runtime system, process needs to modify the referenced memory space of the master runtime system process.

37. A method according to claim 21, further comprising: causing the in aster runtime system process to sleep relative to receiving the process request.

38. A method according to claim 21, further comprising: setting operating system level resource management parameters on the child runtime system process.

39. A method according to claim 21, wherein the object-oriented program code is written in an object oriented programming language.

40. A method according to claim 39, wherein the master runtime system process and the child runtime system process are virtual machines.

41. A computer-readable storage medium holding code for performing the method according to claim 21.

42. A computer system comprising an apparatus for dynamically and persistently tracking incremental profiling data in a process cloning application environment, the apparatus comprising:

means for executing a master runtime system process;

means for cloning a memory space of the master runtime system process as a cloned memory space of a first child runtime system process responsive to a process request, and means for executing the first child runtime system process;

means for storing the initial memory space of the master runtime system process;

means for profiling the execution of the first child runtime system process by means for collecting profiling data incrementally, wherein the profiling data comprises only dynamically observed events of interest that reflect actual usage patterns at runtime, and wherein the profiling data is used to decrease the initialization and execution time of a second cloned child runtime system process; and wherein the second cloned child runtime system process is able to be associated with a different application than the first child runtime system process;

a means for consolidating the profiling data in a master warmup program; and a means for storing the master warmup program, wherein the runtime environment retrieves the master warmup program, executes the master warmup program to warm up the initial memory space of the master runtime system process, and stores the warmed up initial memory space of the master runtime system process as the memory space of the master runtime system process in the storage device.

\* \* \* \* \*

UNITED STATES PATENT AND TRADEMARK OFFICE
CERTIFICATE OF CORRECTION

PATENT NO.         : 7,421,698 B2
APPLICATION NO. : 10/745018
DATED                 : September 2, 2008
INVENTOR(S)      : Nedim Fresko It is certified that error appears in the above-identified patent and that said Letters Patent is hereby corrected as shown below:

In claim 1 (at column 11, line 52), please delete the words, "the memory space" and insert the words --the initial memory space--.

In claim 1 (at column 11, line 61), please delete the words, "execution time or a second cloned child runtime process" and insert the words --execution time of a second cloned child runtime system process--.

In claim 1 (at column 11, line 63), please delete the words, "child runtime process" and insert the words --child runtime system process--.

In claim 12 (at column 12, line 55), please delete the words, "clones the memory space of the" and insert the words --clones the memory space of a--.

In claim 12 (at column 12, line 56), please delete the words, "process as a further child runtime system process" and insert the words --process as a cloned memory space of a further child runtime system process--.

In claim 13 (at column 12, line 60), please delete the words, "dynamically update" and insert the words --dynamically execute--.

In claim 21 (at column 13, line 27), please delete the words, "cloning a memory space" and insert the words --cloning an initial memory space--.

In claim 21 (at column 13, line 38), please delete the words, "as a first child runtime" and insert the words --as a cloned memory space of a first child runtime--.

In claim 21 (at column 13, line 48), please delete the words, "runtime process; and" and insert the words --runtime system process; and--.

UNITED STATES PATENT AND TRADEMARK OFFICE
CERTIFICATE OF CORRECTION

PATENT NO. : 7,421,698 B2
APPLICATION NO. : 10/745018
DATED : September 2, 2008
INVENTOR(S) : Nedim Fresko It is certified that error appears in the above-identified patent and that said Letters Patent is hereby corrected as shown below:

In claim 21 (at column 13, line 49), please delete the words, "the second cloned child runtime process" and insert the words --the second cloned child runtime system process--.

In claim 21 (at column 13, line 54), please delete the words, "storing master warmup" and insert the words --storing master warmup program--.

In claim 21 (at column 13, line 55), please delete the words, "executing a further master runtime system process;".

In claim 21 (at column 13, line 56), please delete the words, "retrieving the master warmup program; and" and insert the words --retrieving the master warmup program--.

In claim 21 (at column 13, line 57), please delete the words, "interpreting, instantiating and warming up the master warmup program into a memory space of the further master runtime system process." and insert the words --executing the master warmup program to warm up the initial memory space of the master runtime process, and storing the warmed up initial memory space of the master runtime system process as the memory space of the master runtime system process in the storage device--.

In claim 32 (at column 14, line 42), please delete the words, "space of the further" and insert the words --space of a further--.

In claim 33 (at column 14, line 48), please delete the words, "dynamically updating" and insert the words --dynamically executing--.

In claim 33 (at column 14, line 50), please delete the words, "execution of the master runtime system process; and" and insert the words --execution of the master runtime system process;--.

UNITED STATES PATENT AND TRADEMARK OFFICE
CERTIFICATE OF CORRECTION

PATENT NO. : 7,421,698 B2
APPLICATION NO. : 10/745018
DATED : September 2, 2008
INVENTOR(S) : Nedim Fresko It is certified that error appears in the above-identified patent and that said Letters Patent is hereby corrected as shown below:

In claim 33 (at column 14, line 51), please delete the words, "interpreting, instantiating and warming up the master warmup program into a memory space of the master runtime system process." and insert the words --to warm up the memory space of the master runtime system process, and storing the warmed up memory space of the master runtime system process as the memory space of the master runtime system process in the storage device.--.

In claim 37 (at column 15, line 6), please delete the words, "causing the in aster runtime system" and insert the words --causing the master runtime system--.

In claim 42 (at column 15, line 24), please delete the words, "means for cloning a memory space; and" and insert the words --means for cloning an initial memory space--.

Signed and Sealed this

Seventeenth Day of February, 2009

JOHN DOLL
*Acting Director of the United States Patent and Trademark Office*